(12) United States Patent
Zhang

(10) Patent No.: US 10,104,030 B2
(45) Date of Patent: Oct. 16, 2018

(54) SYSTEMS AND METHODS FOR MESSAGE PUSHING

(71) Applicant: Tencent Technology (Shenzhen) Company Limited, Shenzhen (CN)

(72) Inventor: Jinsong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 14/688,070

(22) Filed: Apr. 16, 2015

(65) Prior Publication Data

US 2015/0222583 A1 Aug. 6, 2015

Related U.S. Application Data

(63) Continuation of application No. PCT/CN2014/082227, filed on Jul. 15, 2014.

(30) Foreign Application Priority Data

Dec. 9, 2013 (CN) .......................... 2013 1 0661835

(51) Int. Cl.
*G06F 15/16* (2006.01)
*H04L 12/58* (2006.01)
(Continued)

(52) U.S. Cl.
CPC ......... *H04L 51/12* (2013.01); *G06Q 30/0251* (2013.01); *H04L 29/08* (2013.01);
(Continued)

(58) Field of Classification Search
CPC ......... H04L 51/12; H04L 29/08; H04L 67/26; H04L 67/306; G06Q 30/02
(Continued)

(56) References Cited

U.S. PATENT DOCUMENTS

2008/0104061 A1* 5/2008 Rezaei .............. G06F 17/30867
2010/0075701 A1 3/2010 Shang et al.
(Continued)

FOREIGN PATENT DOCUMENTS

CN 1874233 A 12/2006
CN 101034997 A 9/2007
(Continued)

OTHER PUBLICATIONS

China Patent Office, Office Action dated Apr. 19, 2016, in Application No. 201310661835.7.
(Continued)

*Primary Examiner* — Joseph L Greene
(74) *Attorney, Agent, or Firm* — Anova Law Group, PLLC

(57) ABSTRACT

Systems and methods are provided for pushing messages. For example, upon receiving a push trigger message, one or more first user identifiers corresponding to the push trigger message are acquired; in response to the acquired first user identifiers being in a predetermined target user group, one or more first push messages are selected based on at least information associated with a first promotion type of the target user group; and the first push messages are pushed based on at least information associated with the first user identifiers, wherein the target user group includes a plurality of second user identifiers and is generated by statistical processing of first user attributes of registered user identifiers based on at least information associated with a predetermined first forecast model.

20 Claims, 9 Drawing Sheets

(51) Int. Cl.
*H04L 29/08* (2006.01)
*G06Q 30/02* (2012.01)

(52) U.S. Cl.
CPC .............. *H04L 67/22* (2013.01); *H04L 67/26* (2013.01); *H04L 67/306* (2013.01)

(58) Field of Classification Search
USPC .......................................................... 709/206
See application file for complete search history.

(56) References Cited

U.S. PATENT DOCUMENTS

| | | | | |
|---|---|---|---|---|
| 2010/0250370 | A1* | 9/2010 | Jones | G06Q 10/06 705/14.66 |
| 2012/0033605 | A1* | 2/2012 | Yang | H04W 72/005 370/312 |
| 2013/0191213 | A1* | 7/2013 | Beck | G06Q 30/0267 705/14.53 |
| 2014/0067975 | A1* | 3/2014 | Ding | H04L 51/12 709/206 |
| 2014/0105508 | A1* | 4/2014 | Arora | G06K 9/72 382/218 |
| 2016/0105847 | A1* | 4/2016 | Smith | H04L 67/125 370/252 |

FOREIGN PATENT DOCUMENTS

| | | | | |
|---|---|---|---|---|
| CN | 101997894 A | | 3/2011 | |
| CN | 102279889 A | | 12/2011 | |
| CN | 102340514 A | * | 2/2012 | ............. H04L 29/08 |
| CN | 102811207 A | | 12/2012 | |
| CN | 102831170 A | | 12/2012 | |
| CN | 103138954 A | * | 6/2013 | ............. H04L 12/18 |
| CN | 103685502 A | | 3/2014 | |
| TW | 201346809 A | | 11/2013 | |
| WO | WO 2011/119838 A1 | | 9/2011 | |

OTHER PUBLICATIONS

Patent Cooperation Treaty, International Preliminary Report on Patentability, dated Jun. 14, 2016, in PCT/CN2014/082227.
China Patent Office, Office Action dated Sep. 23, 2016, in Application No. 201310661835.7.
Taiwan Patent Office, Office Action dated Sep. 22, 2015, in Application No. 103130464.
Patent Cooperation Treaty, International Search Report & Written Opinion of the International Searching Authority, PCT/CN2014/082227, dated Oct. 22, 2014.
China Patent Office, Office Action dated Feb. 23, 2017, in Application No. 201310661835.7.

* cited by examiner

SYSTEMS AND METHODS FOR MESSAGE PUSHING

CROSS-REFERENCES TO RELATED APPLICATIONS

This application is a continuation of International Application No. PCT/CN2014/082227, with an international filing date of Jul. 15, 2014, now pending, which claims priority to Chinese Patent Application No. 201310661835.7, filed Dec. 9, 2013, both applications being incorporated by reference herein for all purposes.

BACKGROUND OF THE INVENTION

Certain embodiments of the present invention are directed to computer technology. More particularly, some embodiments of the invention provide systems and methods for data processing. Merely by way of example, some embodiments of the invention have been applied to messages. But it would be recognized that the invention has a much broader range of applicability.

Message pushing often refers to sending one or more messages to users in a "broadcast" manner in accordance with some protocols and/or standards. Generally, message pushing is often implemented for certain applications, such as promotion of various services and products. Usually, messages are pushed mainly by portals, various communication applications, various social applications, etc.

Currently, messages to be pushed are often simply selected and filtered before the messages are sent out. For example, some messages concerning game services and new game products, instead of messages concerning furniture and building materials, can be pushed to game users.

The above-noted conventional technology has some disadvantages. For example, a full-push approach is used after the message screening (e.g., selecting, filtering). That is, the push messages obtained through screening are sent to all registered users. There is usually no screening for the registered users, and some of the registered users may be off-line when the push messages are sent, which may result in inefficiency of push resources.

Hence it is highly desirable to improve the techniques for message pushing.

BRIEF SUMMARY OF THE INVENTION

According to one embodiment, a method is provided for pushing messages. For example, upon receiving a push trigger message, one or more first user identifiers corresponding to the push trigger message are acquired; in response to the acquired first user identifiers being in a predetermined target user group, one or more first push messages are selected based on at least information associated with a first promotion type of the target user group; and the first push messages are pushed based on at least information associated with the first user identifiers, wherein the target user group includes a plurality of second user identifiers and is generated by statistical processing of first user attributes of registered user identifiers based on at least information associated with a predetermined first forecast model.

According to another embodiment, a message-push device includes: an acquisition module configured to, upon receiving a push trigger message, acquire one or more first user identifiers corresponding to the push trigger message; and a push module configured to, in response to the acquired first user identifiers being in a predetermined target user group, select one or more first push messages based on at least information associated with a first promotion type of the target user group and push the first push messages based on at least information associated with the first user identifiers. The target user group includes a plurality of second user identifiers and is generated by statistical processing of first user attributes of registered user identifiers based on at least information associated with a predetermined first forecast model.

According to yet another embodiment, a message-push server includes a message-push device. The message-push device includes: an acquisition module configured to, upon receiving a push trigger message, acquire one or more first user identifiers corresponding to the push trigger message; and a push module configured to, in response to the acquired first user identifiers being in a predetermined target user group, select one or more first push messages based on at least information associated with a first promotion type of the target user group and push the first push messages based on at least information associated with the first user identifiers. The target user group includes a plurality of second user identifiers and is generated by statistical processing of first user attributes of registered user identifiers based on at least information associated with a predetermined first forecast model.

According to yet another embodiment, a non-transitory computer readable storage medium includes programming instructions for pushing messages. The programming instructions are configured to cause one or more data processors to execute certain operations. For example, upon receiving a push trigger message, one or more first user identifiers corresponding to the push trigger message are acquired; in response to the acquired first user identifiers being in a predetermined target user group, one or more first push messages are selected based on at least information associated with a first promotion type of the target user group; and the first push messages are pushed based on at least information associated with the first user identifiers, wherein the target user group includes a plurality of second user identifiers and is generated by statistical processing of first user attributes of registered user identifiers based on at least information associated with a predetermined first forecast model.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
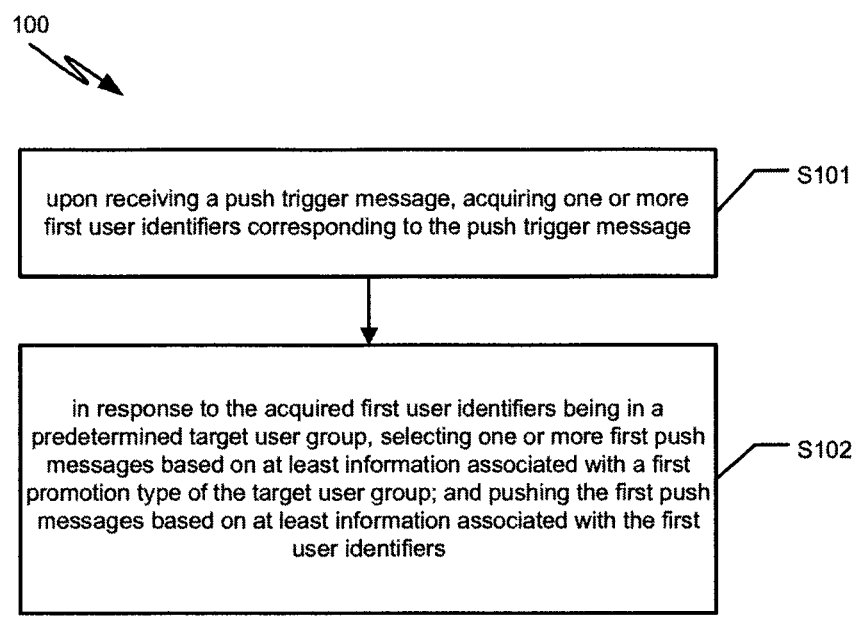
FIG. 1 is a simplified diagram showing a method for message pushing according to one embodiment of the present invention.

FIG. 1 is a simplified diagram showing a method for message pushing according to one embodiment of the present invention. The diagram is merely an example, which should not unduly limit the scope of the claims. One of ordinary skill in the art would recognize many variations, alternatives, and modifications. The method 100 includes at least processes S101-S102. According to some embodiments, the method 100 is implemented for messaging pushing in one or more servers, such as various instant messaging application servers, social application servers and game servers, which can record and manage user identifiers and push relevant messages for the user identifiers.

According to one embodiment, the process S101 includes: upon receiving a push trigger message, acquiring one or more first user identifiers corresponding to the push trigger message. For example, after the user identifiers (e.g., user application accounts, user communication numbers registered in the servers) log in, the user identifiers enter into some game applications, or perform user operations such as consumption and payment. Information related to interactions with the relevant application servers (e.g., login servers, game application servers, payment servers) when the user operations are initiated is taken (e.g., by a server) as push trigger information, in some embodiments. What type of interaction information can serve as the push trigger information is configured according to actual needs or experience, in certain embodiments. For example, after acquiring the push trigger information, the server executes the method 100 on the basis of the push trigger information, and acquires the corresponding user identifiers that send the push trigger information. That is, the user application accounts, the user communication numbers, or other suitable user identifiers are acquired for determining push messages for target users.

According to another embodiment, the process S102 includes: in response to the acquired first user identifiers being in a predetermined target user group, selecting one or more first push messages based on at least information associated with a first promotion type of the target user group, and pushing the first push messages based on at least information associated with the first user identifiers. For example, the predetermined target user group includes a plurality of user identifiers, and is generated by statistics of user attributes of the registered user identifiers according to a predetermined forecast model. As an example, whether the user identifiers fall in the predetermined target user group is judged after the user identifiers that sent the push trigger information are acquired. If the user identifiers fall in the predetermined target user group, the push messages are selected according to the promotion type of the target user group, and pushed according to the user identifiers. If the user identifiers do not fall in the predetermined target user group, users corresponding to the user identifiers may not require the relevant push messages, and therefore, the server does not push the messages to the users corresponding to the user identifiers even after the users corresponding to the user identifiers log in, enter into some game applications, or perform the user operations such as consumption and payment.

According to yet another embodiment, the target user group includes a plurality of second user identifiers and is generated by statistical processing of first user attributes of registered user identifiers based on at least information associated with a predetermined first forecast model. For example, the forecast model can be determined by calculation using a C5.0 decision tree algorithm based on information entropy. Particularly, the forecast model may employ the C5.0 decision tree algorithm. One or more promotion types of sample groups (e.g., sample data sets) are classified by learning the training sample groups, in some embodiments. For example, the classification of the sample groups is carried out based on different user attributes of the users corresponding to the user identifiers in the sample groups. Specifically, the corresponding user identifiers are classified into different groups (e.g., sets) of different promotion types based on different user attributes. The selection of branch variables (user attributes) in the C5.0 decision tree algorithm is performed with various bases. For example, a decreasing rate of information entropy is taken as a basis for determining a best branch variable and a division threshold. The decreasing of information entropy means reduction of information uncertainty, for example. The branch variable refers to a user attribute with greatest contribution to screening of the target users, in some embodiments. As an example, weekly login times and daily game rounds are the important user attributes for judging whether the users are active. The division threshold can be used for judging whether the users are active, in certain embodiments. For example, the users with the daily game rounds greater than 3 are active. On the contrary, the users with the daily game rounds less than 3 are inactive.

In one embodiment, forecast calculation is carried out by taking particular user data of the user attributes corresponding to all or part of the registered user identifiers as data input for a recommended model. For example, the target user group including the user identifiers and meeting push requirements is obtained. As an example, when the target user group of the active users is screened from the registered users as required, the particular user data under the user attributes, such as daily game rounds, daily game durations, daily login times and payment habits, of the registered users are calculated using the recommended model according to the information entropy. In another example, part of the user attributes are selected, and finally, the target user group including the user identifiers with the corresponding game rounds, game durations, login times reaching or exceeding respective thresholds are determined according to the selected part of the user attributes.

In another embodiment, after the users proceed with the operations for triggering messaging pushing, whether the relevant messages are pushed to the users is determined according to the user identifiers of the users and the target user group screened on the basis of the forecast model. The messages are then pushed specifically for the target user group, in some embodiments. For example, the relatively accurate promotion of contents such as services and products is realized, hence improving efficiency of software and hardware sources of a push server and reducing interference with users not necessary for the push messages.

Figure 2:
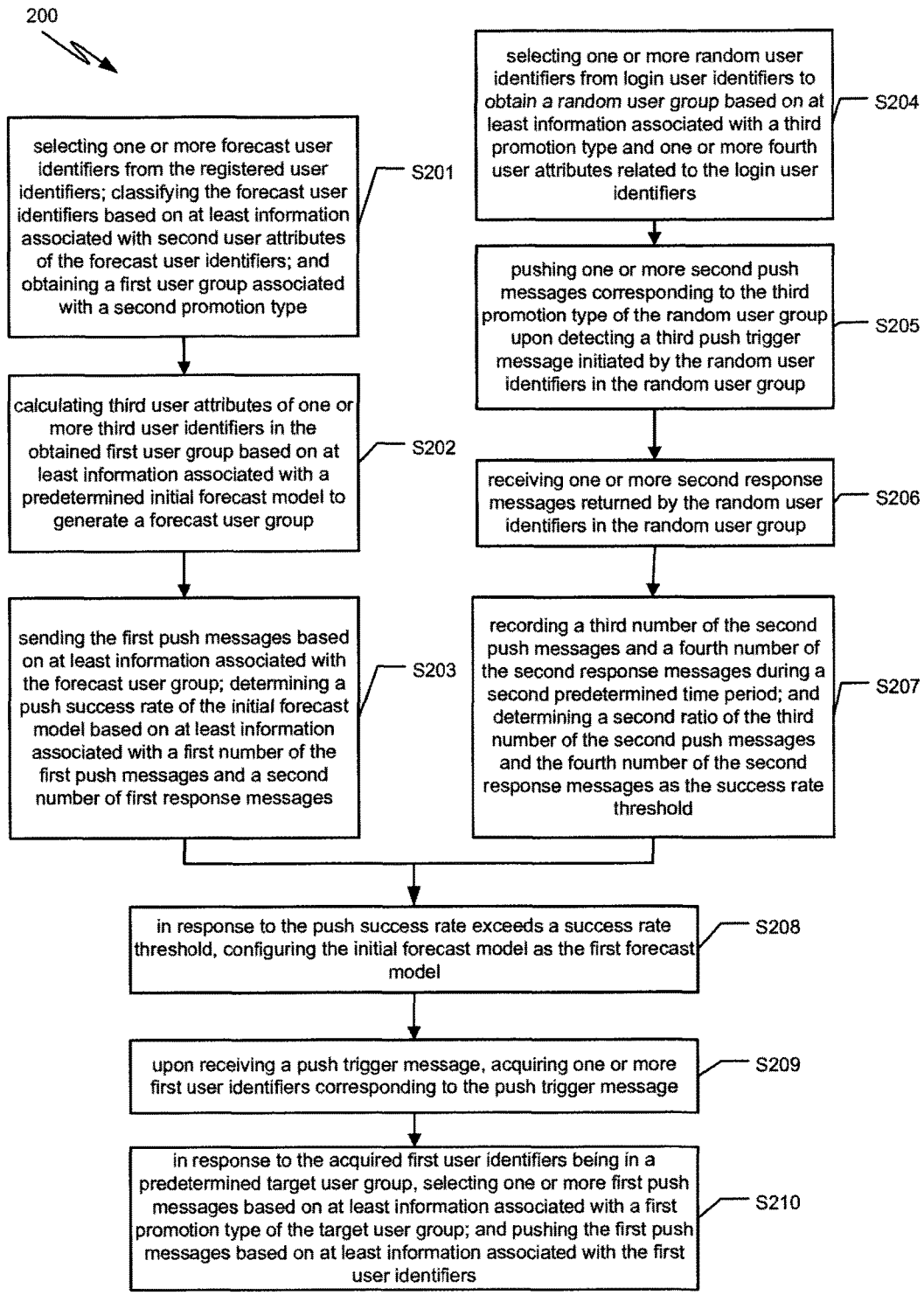
FIG. 2 is a simplified diagram showing a method for message pushing according to another embodiment of the present invention.

FIG. 2 is a simplified diagram showing a method for message pushing according to another embodiment of the present invention. The diagram is merely an example, which should not unduly limit the scope of the claims. One of ordinary skill in the art would recognize many variations, alternatives, and modifications. The method 200 includes at least processes S201-S210. According to some embodiments, the method 200 is implemented for messaging pushing in one or more servers, such as various instant messaging application servers, social application servers and game servers, which can record and manage user identifiers and push relevant messages for the user identifiers.

According to one embodiment, the process S201 includes: selecting one or more forecast user identifiers from the registered user identifiers; classifying the forecast user identifiers based on at least information associated with second user attributes of the forecast user identifiers; and obtaining a first user group associated with a second promotion type. For example, a forecast model is configured by selecting part of the users from the registered users. Different user groups (e.g., sets) including relevant user identifiers may be obtained based on user attributes and one or more classification rules of certain forecast user identifiers. For example, an active user group, a return user group and/or a payment user group may be obtained based on different promotion types for active users, return users and/or payment users. As an example, the active user group can be determined according to certain user attributes such as daily game rounds, daily game durations and/or daily login times. The return user group can be determined according to certain user attributes such as previous login durations and/or login intervals. The payment user group can be determined according to some user attributes such as payment habits, payment times and/or payment use durations.

According to another embodiment, the process S202 includes: calculating third user attributes of one or more third user identifiers in the obtained first user group based on at least information associated with a predetermined initial forecast model to generate a forecast user group. For example, after the user groups are obtained, the user attributes corresponding to the user identifiers in the user groups are calculated according to calculations related to information entropy of an initial forecast model. That is, the particular user data of the user attributes is calculated. As an example, a gain brought by some user attributes can be worked out on the basis of the information entropy. For example, when whether the users are active is determined, the particular user data such as the daily game rounds, daily game durations and/or daily login times are subjected to information-entropy calculations. One or two user attributes that generate obvious gain with respect to the determination of whether the users are active are determined among the user attributes such as the daily game rounds, daily game durations and daily login times based on the information-entropy calculations. Then, the user identifiers with user data values greater than one or more predetermined thresholds are selected. For example, a particular user attribute (e.g., daily game rounds) is selected on the basis of the information entropy, and then the user identifiers with the daily game rounds greater than a certain round threshold are selected to generate the forecast user group.

According to yet another embodiment, the process S203 includes: sending the first push messages based on at least information associated with the forecast user group; and determining a push success rate of the initial forecast model based on at least information associated with a first number of the first push messages and a second number of first response messages. For example, the push messages can be sent to either the users corresponding to the user identifiers in the forecast user group, or the users corresponding to the user identifiers having logged in currently. After receiving the corresponding push messages, a client can notify the users of the push messages using the existing standing advertisements, pop-up windows, etc. The users can respond with one or more events, such as mouse clicks, and one or more response messages are sent to the server. The server can determine the push success rate of the forecast user group according to a first number of the push messages and a second number of the response messages returned according to the push messages. Particularly, the ratio of the first number and the second number can serve as the push success rate.

In one embodiment, the process S204 includes: selecting one or more random user identifiers from login user identifiers to obtain a random user group based on at least information associated with a third promotion type and one or more fourth user attributes related to the login user identifiers. For example, during the process S204, the user identifiers are selected from the login user identifiers to form the random user group based on the user attributes of the registered user identifiers that have logged in and the same classification rules as those for the forecast user group.

In another embodiment, the process S205 includes: pushing one or more second push messages corresponding to the third promotion type of the random user group upon detecting a third push trigger message initiated by the random user identifiers in the random user group. For example, the push messages can be sent to either the users corresponding to the user identifiers in the random user group, or only the users corresponding to the user identifiers that have logged in currently.

In yet another embodiment, the process S206 includes: receiving one or more second response messages returned by the random user identifiers in the random user group. For example, the response messages returned by the corresponding user identifiers in the random user group to respond to the push messages sent during the process S205 are received. In another example, the process S207 includes: recording a third number of the second push messages and a fourth number of the second response messages during a second predetermined time period, and determining a second ratio of the third number of the second push messages and the fourth number of the second response messages as the success rate threshold. As an example, the server can determine the push success rate of the forecast user group according to the number of the sent push messages and the number of the response messages. Particularly, the ratio of these numbers can serve as the success rate threshold. The push success rate determined during the process S203 is compared with the success rate threshold determined during the process S207, in some embodiments. The process S208 is executed if the push success rate exceeds the success rate threshold, in certain embodiments. Otherwise, the process S209 is executed.

According to one embodiment, the process S208 includes: in response to the push success rate exceeds a success rate threshold, configuring the initial forecast model as the first forecast model. For example, in response to the push success rate not exceeding the success rate threshold, the second user attributes of the forecast user identifiers in the forecast user group corresponding to the second promotion type are modified to configure to the first forecast model. As an example, the user identifiers in the user groups of the corresponding promotion types are re-calculated by adding or reducing the corresponding user attributes. That is, the processes S202-S207 are repeated on the basis of the new user attributes in the user groups and the particular user data of the user attributes till the determined push success rate exceeds the predetermined success rate threshold, and the forecast model is then configured. The processes S201-S208 correspond to configuration processes of the forecast model, in some embodiments. The processes S209-S210 are executed after the forecast model is configured, in certain embodiments.

According to another embodiment, the process S209 includes: upon receiving a push trigger message, acquiring one or more first user identifiers corresponding to the push trigger message. For example, after the user identifiers (e.g., user application accounts, user communication numbers registered in the servers) log in, the user identifiers enter into some game applications, or perform user operations such as consumption and payment. Information related to interactions with the relevant application servers (e.g., login servers, game application servers, payment servers) when the user operations are initiated is taken (e.g., by a server) as push trigger information, in some embodiments. What type of interaction information can serve as the push trigger information is configured according to actual needs or experience, in certain embodiments. For example, after acquiring the push trigger information, the server executes the method 100 on the basis of the push trigger information, and acquires the corresponding user identifiers that send the push trigger information. That is, the user application accounts, the user communication numbers, or other suitable user identifiers are acquired for determining push messages for target users.

According to yet another embodiment, the process S210 includes: in response to the acquired first user identifiers being in a predetermined target user group, selecting one or more first push messages based on at least information associated with a first promotion type of the target user group and pushing the first push messages based on at least information associated with the first user identifiers. As an example, whether the user identifiers fall in the predetermined target user group is judged after the user identifiers that sent the push trigger information are acquired. If the user identifiers fall in the predetermined target user group, the push messages are selected according to the promotion type of the target user group, and pushed according to the user identifiers. If the user identifiers do not fall in the predetermined target user group, users corresponding to the user identifiers may not require the relevant push messages, and therefore, the server does not push the messages to the users corresponding to the user identifiers even after the users corresponding to the user identifiers log in, enter into some game applications, or perform the user operations such as consumption and payment.

In certain embodiments, the method 200 further includes: detecting whether an update cycle arrives, and in response to the update cycle arriving, configuring the forecast model. For example, a week or a month is taken as the update cycle. When the update cycle arrives, the processes S201-S208 are repeated to accomplish the configuration of a new forecast model, in some embodiments. For example, a success rate threshold is predetermined in the processes S204-S207. In another example, the success rate threshold can be configured manually according to user experience.

Figure 3:
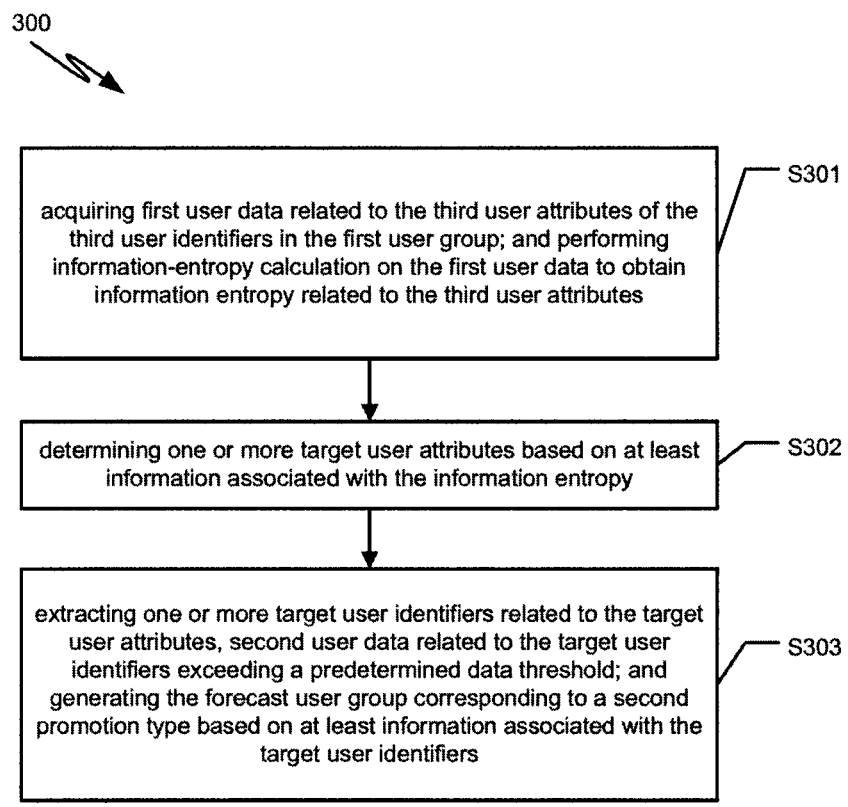
FIG. 3 is a simplified diagram showing a method for generating a forecast user group according to one embodiment of the present invention.

FIG. 3 is a simplified diagram showing a method for generating a forecast user group according to one embodiment of the present invention. The diagram is merely an example, which should not unduly limit the scope of the claims. One of ordinary skill in the art would recognize many variations, alternatives, and modifications. The method 300 includes at least processes S301-S303. For example, the method 300 corresponds to the process S202.

According to one embodiment, the process S301 includes: acquiring first user data related to the third user attributes of the third user identifiers in the first user group, performing information-entropy calculation on the first user data to obtain information entropy related to the third user attributes. For example, the process S302 includes: determining one or more target user attributes based on at least information associated with the information entropy. In another example, the process S303 includes: extracting one or more target user identifiers related to the target user attributes, second user data related to the target user identifiers exceeding a predetermined data threshold and generating the forecast user group corresponding to a second promotion type based on at least information associated with the target user identifiers.

According to another embodiment, during the process S301, information-entropy calculation for a user attribute in a user group is performed as follows. For example, S represents the user group; the user attribute C includes K classes (e.g., the user attribute of user education background includes junior high school education, senior high school education and university education); freq (Ci, S) represents a sample number of a user attribute Ci; and |S| represents a sample number of the user group S. The information entropy of the user group S is defined as follows:

$$\mathrm{Info}(S) = -\sum_{i=1}^{k}((freq(C_i, S)/|S|) \times \log_2(freq(C_i, S)/|S|))$$

As an example, if a user attribute T includes N classes, a conditional information entropy is defined after the user attribute T is introduced:

$$\mathrm{Info}(T) = -\sum_{i=1}^{n}((|T_i|/|T|) \times \mathrm{Info}(T_i))$$

Therefore, an information gain related to the user attribute T is as follows:

Gain(T)=Info(S)−Info(T)

The user attributes with the higher gains are determined in the process S302, and are taken as target user attributes for obtaining the forecast user group according to the magnitude of the information gain of each user attribute, in some embodiments.

Figure 4:
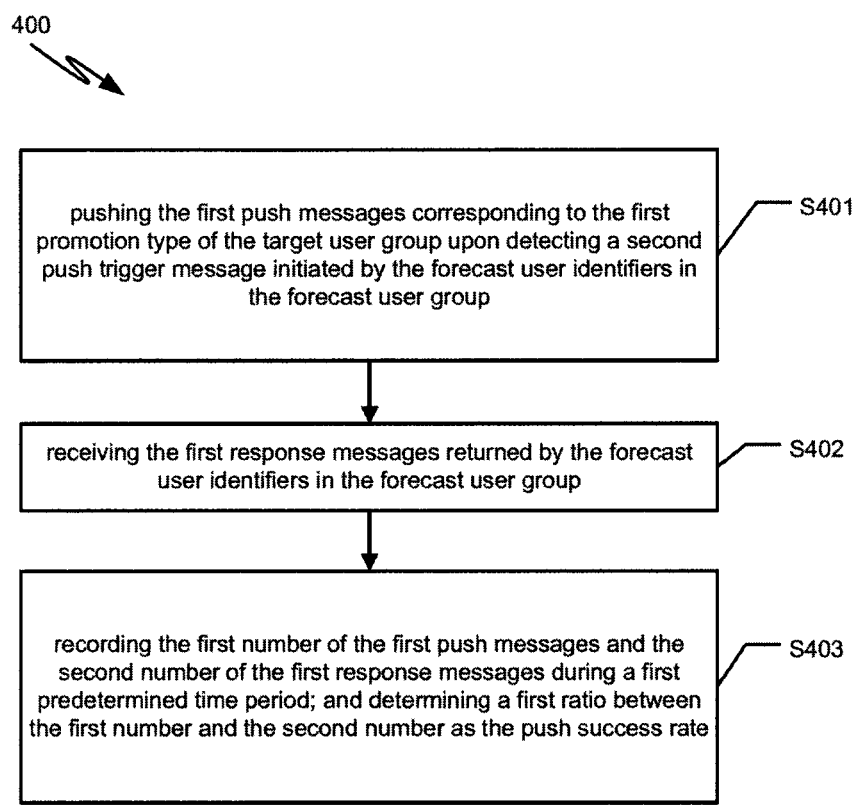
FIG. 4 is a simplified diagram showing a method for determining a push success rate according to one embodiment of the present invention.

FIG. 4 is a simplified diagram showing a method for determining a push success rate according to one embodiment of the present invention. The diagram is merely an example, which should not unduly limit the scope of the claims. One of ordinary skill in the art would recognize many variations, alternatives, and modifications. The method 400 includes at least processes S401-S403. For example, the method 400 corresponds to the process S203.

According to one embodiment, the process S401 includes: pushing the first push messages corresponding to the first promotion type of the target user group upon detecting a second push trigger message initiated by the forecast user identifiers in the forecast user group. For example, the process S402 includes: receiving the first response messages returned by the forecast user identifiers in the forecast user group. In another example, the process S403 includes: recording a third number of the second push messages and a fourth number of the second response messages during a second predetermined time period and determining a second ratio of the third number of the second push messages and the fourth number of the second response messages as the success rate threshold.

According to another embodiment, after the users proceed with the operations for triggering messaging pushing, whether the relevant messages are pushed to the users is determined according to the user identifiers of the users and the target user group screened on the basis of the forecast model. The messages are then pushed specifically for the target user group, in some embodiments. For example, the relatively accurate promotion of contents such as services and products is realized, hence improving efficiency of software and hardware sources of a push server and reducing interference with users not necessary for the push messages.

Figure 5:
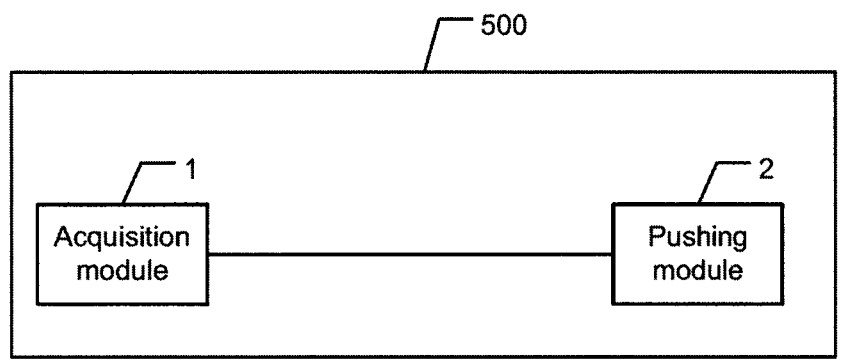
FIG. 5 is a simplified diagram showing a message-push device according to one embodiment of the present invention.

FIG. 5 is a simplified diagram showing a message-push device according to one embodiment of the present invention. The diagram is merely an example, which should not unduly limit the scope of the claims. One of ordinary skill in the art would recognize many variations, alternatives, and modifications. According to some embodiments, the device 500 is implemented for messaging pushing in one or more servers.

According to one embodiment, the device 500 includes: an acquisition module 1 configured to, upon receiving a push trigger message, acquire one or more first user identifiers corresponding to the push trigger message; and a push module 2 configured to, in response to the acquired first user identifiers being in a predetermined target user group, select one or more first push messages based on at least information associated with a first promotion type of the target user group and push the first push messages based on at least information associated with the first user identifiers. For example, the target user group includes a plurality of second user identifiers and is generated by statistical processing of first user attributes of registered user identifiers based on at least information associated with a predetermined first forecast model. As an example, after the user identifiers (e.g., user application accounts, user communication numbers registered in the servers) log in, the user identifiers enter into some game applications, or perform user operations such as consumption and payment. Information related to interactions with the relevant application servers (e.g., login servers, game application servers, payment servers) when the user operations are initiated is taken (e.g., by a server) as push trigger information, in some embodiments. What type of interaction information can serve as the push trigger information is configured according to actual needs or experience, in certain embodiments.

According to another embodiment, the push module 2 pushes the push messages based on the push trigger information acquired by the acquisition module 1, and acquires the corresponding user identifiers sending the push trigger information after the acquisition module 1 acquires the push trigger information. That is, the user application accounts, the user communication numbers, or other suitable user identifiers are acquired for determining the push messages for the target users, in some embodiments. For example, whether the user identifiers fall in the predetermined target user group, is judged after the push module 2 acquires the user identifiers sending the push trigger information. If the user identifiers fall in the predetermined target user group, the push messages are selected according to the promotion type of the target user group, and pushed according to the user identifiers. If the user identifiers do not fall in the predetermined target user group, the users corresponding to the user identifiers may not require the relevant push messages. Therefore, the push module 2 will not push the messages to the users corresponding to the user identifiers after the users corresponding to the user identifiers log in, enter into some game applications or perform the user operations such as the consumption and payment.

According to yet another embodiment, after the users proceed with the operations for triggering messaging pushing, whether the relevant messages are pushed to the users is determined according to the user identifiers of the users and the target user group screened on the basis of the forecast model. The messages are then pushed specifically for the target user group, in some embodiments. For example, the relatively accurate promotion of contents such as services and products is realized, hence improving efficiency of software and hardware sources of a push server and reducing interference with users not necessary for the push messages.

Figure 6:
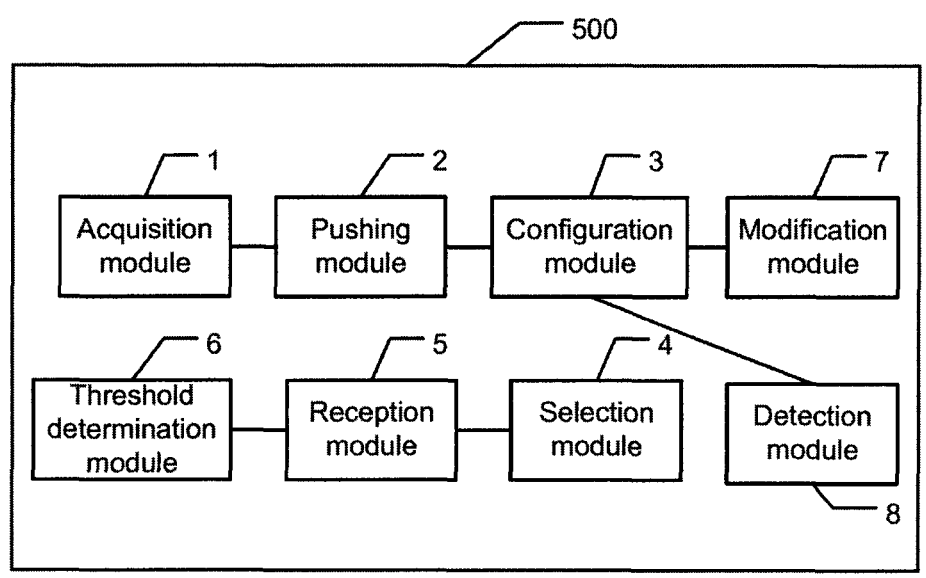
FIG. 6 is a simplified diagram showing a message-push device according to another embodiment of the present invention.

FIG. 6 is a simplified diagram showing a message-push device according to another embodiment of the present invention. The diagram is merely an example, which should not unduly limit the scope of the claims. One of ordinary skill in the art would recognize many variations, alternatives, and modifications. The device 500 further includes: a configuration module 3, a selection module 4, a reception module 5, a threshold determination module 6, a modification module 7, and a detection module 8.

Figure 7:
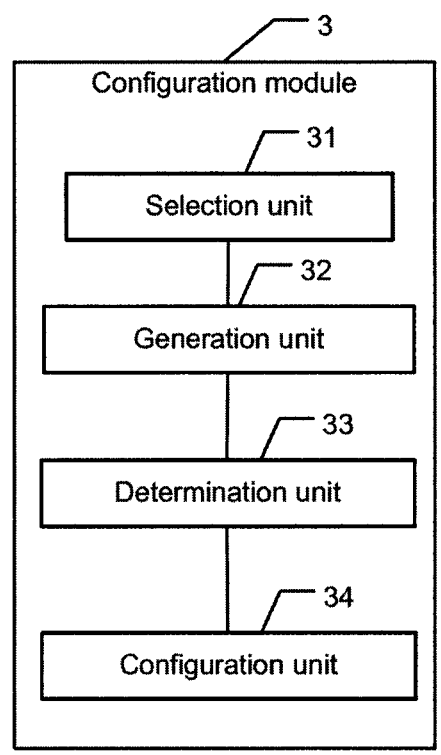
FIG. 7 is a simplified diagram showing a configuration module as part of the message-push device as shown in FIG. 6 according to one embodiment of the present invention.

FIG. 7 is a simplified diagram showing a configuration module as part of the message-push device as shown in FIG. 6 according to one embodiment of the present invention. The diagram is merely an example, which should not unduly limit the scope of the claims. One of ordinary skill in the art would recognize many variations, alternatives, and modifications.

According to one embodiment, the configuration module 3 includes: a selection unit 31 configured to select one or more forecast user identifiers from the registered user identifiers, classify the forecast user identifiers based on at least information associated with second user attributes of the forecast user identifiers, and obtain a first user group associated with a second promotion type; a generation unit 32 configured to calculate third user attributes of one or more third user identifiers in the obtained first user group based on at least information associated with a predetermined initial forecast model to generate a forecast user group; a determination unit 33 configured to send the first push messages based on at least information associated with the forecast user group and determine a push success rate of the initial forecast model based on at least information associated with a first number of the first push messages and a second number of first response messages; and a configuration unit 34 configured to, in response to the push success rate exceeds a success rate threshold, configure the initial forecast model as the first forecast model.

According to another embodiment, the selection unit 31 selects part of the users from the registered users to configure the forecast model. Different user groups (e.g., sets) including relevant user identifiers may be obtained based on user attributes and one or more classification rules of certain forecast user identifiers. For example, an active user group, a return user group and/or a payment user group may be obtained based on different promotion types for active users, return users and/or payment users. As an example, the active user group can be determined according to certain user attributes such as daily game rounds, daily game durations and/or daily login times. The return user group can be determined according to certain user attributes such as previous login durations and/or login intervals. The payment user group can be determined according to some user attributes such as payment habits, payment times and/or payment use durations.

According to yet another embodiment, after the user groups are obtained, the generation unit 32 is configured to calculate the user attributes corresponding to the user identifiers in the user groups according to calculations related to information entropy of an initial forecast model. That is, the particular user data of the user attributes is calculated. As an example, a gain brought by some user attributes can be worked out on the basis of the information entropy. For example, when whether the users are active is determined, the particular user data such as the daily game rounds, daily game durations and/or daily login times are subjected to information-entropy calculations. One or two user attributes that generate obvious gain with respect to the determination of whether the users are active are determined among the user attributes such as the daily game rounds, daily game durations and daily login times based on the information-entropy calculations. Then, the user identifiers with user data values greater than one or more predetermined thresholds are selected. For example, a particular user attribute (e.g., daily game rounds) is selected on the basis of the information entropy, and then the user identifiers with the daily game rounds greater than a certain round threshold are selected to generate the forecast user group.

Figure 8:
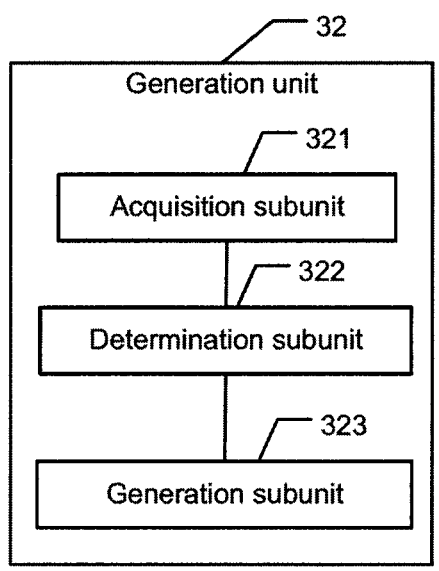
FIG. 8 is a simplified diagram showing a generation unit as part of the message-push device as shown in FIG. 7 according to one embodiment of the present invention.

FIG. 8 is a simplified diagram showing a generation unit as part of the message-push device as shown in FIG. 7 according to one embodiment of the present invention. The diagram is merely an example, which should not unduly limit the scope of the claims. One of ordinary skill in the art would recognize many variations, alternatives, and modifications.

According to one embodiment, the generation unit 32 includes: an acquisition subunit 321 configured to acquire first user data related to the third user attributes of the third user identifiers in the first user group and perform information-entropy calculation on the first user data to obtain information entropy related to the third user attributes; a determination subunit 322 configured to determine one or more target user attributes based on at least information associated with the information entropy; and a generation subunit 323 configured to extract one or more target user identifiers related to the target user attributes, second user data related to the target user identifiers exceeding a predetermined data threshold, and generate the forecast user group corresponding to a second promotion type based on at least information associated with the target user identifiers.

Figure 9:
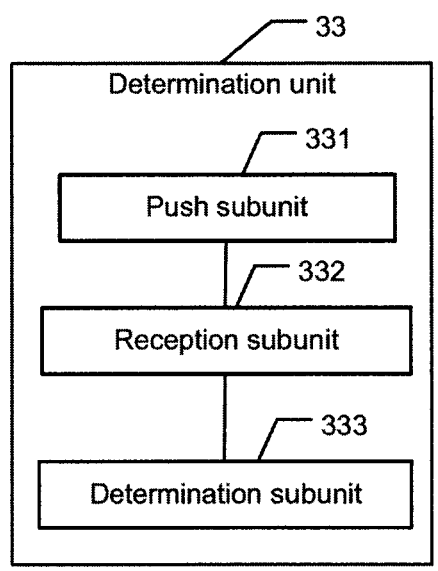
FIG. 9 is a simplified diagram showing a determination unit as part of the message-push device as shown in FIG. 7 according to one embodiment of the present invention.

FIG. 9 is a simplified diagram showing a determination unit as part of the message-push device as shown in FIG. 7 according to one embodiment of the present invention. The diagram is merely an example, which should not unduly limit the scope of the claims. One of ordinary skill in the art would recognize many variations, alternatives, and modifications.

According to one embodiment, the determination unit 33 includes: a push subunit 331 configured to push the first push messages corresponding to the first promotion type of the target user group upon detecting a second push trigger message initiated by the forecast user identifiers in the forecast user group; a reception subunit 332 configured to receive the first response messages returned by the forecast user identifiers in the forecast user group; and a determination subunit 333 configured to record the first number of the first push messages and the second number of the first response messages during a first predetermined time period and determine a first ratio between the first number and the second number as the push success rate.

Referring back to FIG. 6, the selection module 4 is configured to select one or more random user identifiers from login user identifiers to obtain a random user group based on at least information associated with a third promotion type and one or more fourth user attributes related to the login user identifiers, in some embodiments. For example, the push module 2 is further configured to push one or more second push messages corresponding to the third promotion type of the random user group upon detecting a third push trigger message initiated by the random user identifiers in the random user group. As an example, the reception module 5 is configured to receive one or more second response messages returned by the random user identifiers in the random user group. As another example, the threshold determination module 6 is configured to record a third number of the second push messages and a fourth number of the second response messages during a second predetermined time period and determine a second ratio of the third number of the second push messages and the fourth number of the second response messages as the success rate threshold.

According to some embodiments, the user identifiers can be randomly selected from some login users (e.g., the active users logged in the day before) to form the random user group. The success rate threshold is generated on the basis of the random user groups for judging whether the initial forecast model has reached a standard, in some embodiments.

As shown in FIG. 6, the modification module 7 is configured to, in response to the push success rate not exceeding the success rate threshold, modify the second user attributes of the forecast user identifiers in the forecast user group corresponding to the second promotion type to configure to the first forecast model, in certain embodiments. For example, the configuration module 3 is informed to re-calculate the user identifiers in the user groups of the corresponding promotion types by adding or decreasing the corresponding user attributes till the determined push success rate exceeds the predetermined success rate threshold, and the forecast model is then configured. As an example, the detection module 8 is configured to detect whether an update cycle arrives and, in response to the update cycle arriving, configure the forecast model. For example, a week or a month is taken as the update cycle. When the update cycle arrives, the configuration module is informed to accomplish the configuration of the forecast model, in some embodiments.

In another embodiment, after the users proceed with the operations for triggering messaging pushing, whether the relevant messages are pushed to the users is determined according to the user identifiers of the users and the target user group screened on the basis of the forecast model. The messages are then pushed specifically for the target user group, in some embodiments. For example, the relatively accurate promotion of contents such as services and products is realized, hence improving efficiency of software and hardware sources of a push server and reducing interference with users not necessary for the push messages. The forecast model can be configured and modified on the basis of actual situations to ensure the accuracy of messaging pushing, in certain embodiments.

According to one embodiment, a method is provided for pushing messages. For example, upon receiving a push trigger message, one or more first user identifiers corresponding to the push trigger message are acquired; in response to the acquired first user identifiers being in a predetermined target user group, one or more first push messages are selected based on at least information associated with a first promotion type of the target user group; and the first push messages are pushed based on at least information associated with the first user identifiers, wherein the target user group includes a plurality of second user identifiers and is generated by statistical processing of first user attributes of registered user identifiers based on at least information associated with a predetermined first forecast model. For example, the method is implemented according to at least FIG. 1 and/or FIG. 2.

According to another embodiment, a message-push device includes: an acquisition module configured to, upon receiving a push trigger message, acquire one or more first user identifiers corresponding to the push trigger message; and a push module configured to, in response to the acquired first user identifiers being in a predetermined target user group, select one or more first push messages based on at least information associated with a first promotion type of the target user group and push the first push messages based on at least information associated with the first user identifiers. The target user group includes a plurality of second user identifiers and is generated by statistical processing of first user attributes of registered user identifiers based on at least information associated with a predetermined first forecast model. For example, the device is implemented according to at least FIG. 5 and/or FIG. 6.

According to yet another embodiment, a message-push server includes a message-push device. The message-push device includes: an acquisition module configured to, upon receiving a push trigger message, acquire one or more first user identifiers corresponding to the push trigger message; and a push module configured to, in response to the acquired first user identifiers being in a predetermined target user group, select one or more first push messages based on at least information associated with a first promotion type of the target user group and push the first push messages based on at least information associated with the first user identifiers. The target user group includes a plurality of second user identifiers and is generated by statistical processing of first user attributes of registered user identifiers based on at least information associated with a predetermined first forecast model. For example, the server is implemented according to at least FIG. 5 and/or FIG. 6.

According to yet another embodiment, a non-transitory computer readable storage medium includes programming instructions for pushing messages. The programming instructions are configured to cause one or more data processors to execute certain operations. For example, upon receiving a push trigger message, one or more first user identifiers corresponding to the push trigger message are acquired; in response to the acquired first user identifiers being in a predetermined target user group, one or more first push messages are selected based on at least information associated with a first promotion type of the target user group; and the first push messages are pushed based on at least information associated with the first user identifiers, wherein the target user group includes a plurality of second user identifiers and is generated by statistical processing of first user attributes of registered user identifiers based on at least information associated with a predetermined first forecast model. For example, the storage medium is implemented according to at least FIG. 1 and/or FIG. 2.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for pushing messages, the method comprising:
   upon receiving a push trigger message, acquiring one or more first user identifiers corresponding to the push trigger message;
   in response to the acquired first user identifiers being in a predetermined target user group, selecting one or more first push messages based on at least information associated with a first promotion type of the target user group; and
   pushing the first push messages based on at least information associated with the first user identifiers,
   wherein the target user group includes a plurality of second user identifiers and is generated by statistical processing of first user attributes of registered user identifiers based on at least information associated with a predetermined first forecast model,
   wherein the method further comprises:
   selecting, randomly, one or more fourth user identifiers from login user identifiers to obtain a second user group, the fourth user identifiers corresponding to information associated with a third promotion type and one or more fourth user attributes;
   pushing one or more second push messages corresponding to the third promotion type of the second user group upon detecting a third push trigger message initiated by the fourth user identifiers in the second user group;
   receiving one or more second response messages returned by the fourth user identifiers in the second user group;
   recording a third number of the second push messages and a fourth number of the second response messages during a second predetermined time period;
   determining a second ratio of the third number of the second push messages and the fourth number of the second response messages as a success rate threshold; and
   configuring the first forecast model based on a comparison result between a push success rate of a predetermined initial forecast model and the success rate threshold.

2. The method of claim 1, wherein the configuring the first forecast model includes:
   selecting one or more forecast user identifiers from the registered user identifiers;
   classifying the forecast user identifiers based on at least information associated with second user attributes of the forecast user identifiers;
   obtaining a first user group associated with a second promotion type;
   calculating third user attributes of one or more third user identifiers in the obtained first user group based on at least information associated with the initial forecast model to generate a forecast user group;
   sending the first push messages based on at least information associated with the forecast user group;
   determining a push success rate of the initial forecast model based on at least information associated with a first number of the first push messages and a second number of first response messages; and
   in response to the push success rate exceeds the success rate threshold, configuring the initial forecast model as the first forecast model.

3. The method of claim 2, wherein the calculating third user attributes of one or more third user identifiers in the obtained first user group based on at least information associated with a predetermined initial forecast model to generate a forecast user group includes:
   acquiring first user data related to the third user attributes of the third user identifiers in the first user group;
   performing information-entropy calculation on the first user data to obtain information entropy related to the third user attributes;
   determining one or more target user attributes based on at least information associated with the information entropy;
   extracting one or more target user identifiers related to the target user attributes, second user data related to the target user identifiers exceeding a predetermined data threshold; and
   generating the forecast user group corresponding to a second promotion type based on at least information associated with the target user identifiers.

4. The method of claim 2, wherein the sending the first messages based on at least information associated with the forecast user group and the determining a push success rate of the initial forecast model based on at least information associated with a first number of the first push messages and a second number of first response messages include:

pushing the first push messages corresponding to the first promotion type of the target user group upon detecting a second push trigger message initiated by the forecast user identifiers in the forecast user group;

receiving the first response messages returned by the forecast user identifiers in the forecast user group;

recording the first number of the first push messages and the second number of the first response messages during a first predetermined time period; and determining a first ratio between the first number and the second number as the push success rate.

5. The method of claim 1, further comprising:

in response to the push success rate not exceeding the success rate threshold, modifying the second user attributes of the forecast user identifiers in the forecast user group corresponding to the second promotion type to configure to the first forecast model.

6. The method of claim 5, further comprising:

detecting whether an update cycle arrives; and in response to the update cycle arriving, configuring the forecast model.

7. A message-push device comprising:

an acquisition module configured to, upon receiving a push trigger message, acquire one or more first user identifiers corresponding to the push trigger message; and a push module configured to, in response to the acquired first user identifiers being in a predetermined target user group, select one or more first push messages based on at least information associated with a first promotion type of the target user group and push the first push messages based on at least information associated with the first user identifiers;

wherein the target user group includes a plurality of second user identifiers and is generated by statistical processing of first user attributes of registered user identifiers based on at least information associated with a predetermined first forecast model, wherein the message-push device further comprises:

a selection module configured to select, randomly, one or more fourth user identifiers from login user identifiers to obtain a second user group, the fourth user identifiers corresponding to information associated with a third promotion type and one or more fourth user attributes;

wherein the push module is further configured to push one or more second push messages corresponding to the third promotion type of the second user group upon detecting a third push trigger message initiated by the fourth user identifiers in the second user group;

a reception module configured to receive one or more second response messages returned by the fourth user identifiers in the second user group;

a threshold determination module configured to record a third number of the second push messages and a fourth number of the second response messages during a second predetermined time period and determine a second ratio of the third number of the second push messages and the fourth number of the second response messages as a success rate threshold; and a configuration module configured to configure the first forecast model based on a comparison result between a push success rate of a predetermined initial forecast model and the success rate threshold.

8. The device of claim 7, wherein the configuration module includes:

a selection unit configured to select one or more forecast user identifiers from the registered user identifiers, classify the forecast user identifiers based on at least information associated with second user attributes of the forecast user identifiers, and obtain a first user group associated with a second promotion type;

a generation unit configured to calculate third user attributes of one or more third user identifiers in the obtained first user group based on at least information associated with the initial forecast model to generate a forecast user group;

a determination unit configured to send the first push messages based on at least information associated with the forecast user group and determine a push success rate of the initial forecast model based on at least information associated with a first number of the first push messages and a second number of first response messages; and a configuration unit configured to, in response to the push success rate exceeds the success rate threshold, configure the initial forecast model as the first forecast model.

9. The device of claim 8, wherein the generation unit includes:

an acquisition subunit configured to acquire first user data related to the third user attributes of the third user identifiers in the first user group and perform information-entropy calculation on the first user data to obtain information entropy related to the third user attributes;

a determination subunit configured to determine one or more target user attributes based on at least information associated with the information entropy; and a generation subunit configured to extract one or more target user identifiers related to the target user attributes, second user data related to the target user identifiers exceeding a predetermined data threshold, and generate the forecast user group corresponding to a second promotion type based on at least information associated with the target user identifiers.

10. The device of claim 8, wherein the determination unit includes:

a push subunit configured to push the first push messages corresponding to the first promotion type of the target user group upon detecting a second push trigger message initiated by the forecast user identifiers in the forecast user group;

a reception subunit configured to receive the first response messages returned by the forecast user identifiers in the forecast user group; and a determination subunit configured to record the first number of the first push messages and the second number of the first response messages during a first predetermined time period and determine a first ratio between the first number and the second number as the push success rate.

11. The device of claim 8, further comprising:

a modification module configured to, in response to the push success rate not exceeding the success rate threshold, modify the second user attributes of the forecast user identifiers in the forecast user group corresponding to the second promotion type to configure to the first forecast model.

12. The device of claim 11, further comprising:

a detection module configured to detect whether an update cycle arrives and, in response to the update cycle arriving, configure the forecast model.

13. The device of claim 7, further comprising:

one or more data processors; and a computer-readable storage medium;

wherein the acquisition module and the push module are stored in the storage medium and configured to be executed by the one or more data processors.

14. A message-push server comprising:
a message-push device;
wherein the message-push device includes:
an acquisition module configured to, upon receiving a push trigger message, acquire one or more first user identifiers corresponding to the push trigger message; and
a push module configured to, in response to the acquired first user identifiers being in a predetermined target user group, select one or more first push messages based on at least information associated with a first promotion type of the target user group and push the first push messages based on at least information associated with the first user identifiers;
wherein the target user group includes a plurality of second user identifiers and is generated by statistical processing of first user attributes of registered user identifiers based on at least information associated with a predetermined first forecast model,
wherein the message-push device further includes:
a selection module configured to select, randomly, one or more fourth user identifiers from login user identifiers to obtain a second user group, the fourth user identifiers corresponding to information associated with a third promotion type and one or more fourth user attributes;
wherein the push module is further configured to push one or more second push messages corresponding to the third promotion type of the second user group upon detecting a third push trigger message initiated by the fourth user identifiers in the second user group;
a reception module configured to receive one or more second response messages returned by the fourth user identifiers in the second user group; and
a threshold determination module configured to record a third number of the second push messages and a fourth number of the second response messages during a second predetermined time period and determine a second ratio of the third number of the second push messages and the fourth number of the second response messages as a success rate threshold; and
a configuration module configured to configure the first forecast model based on a comparison result between a push success rate of a predetermined initial forecast model and the success rate threshold.

15. The server of claim 14, wherein the configuration module includes:
a selection unit configured to select one or more forecast user identifiers from the registered user identifiers, classify the forecast user identifiers based on at least information associated with second user attributes of the forecast user identifiers, and obtain a first user group associated with a second promotion type;
a generation unit configured to calculate third user attributes of one or more third user identifiers in the obtained first user group based on at least information associated with the initial forecast model to generate a forecast user group;
a determination unit configured to send the first push messages based on at least information associated with the forecast user group and determine a push success rate of the initial forecast model based on at least information associated with a first number of the first push messages and a second number of first response messages; and a configuration unit configured to, in response to the push success rate exceeds the success rate threshold, configure the initial forecast model as the first forecast model.

16. The server of claim 15, wherein the generation unit includes:
an acquisition subunit configured to acquire first user data related to the third user attributes of the third user identifiers in the first user group and perform information-entropy calculation on the first user data to obtain information entropy related to the third user attributes;
a determination subunit configured to determine one or more target user attributes based on at least information associated with the information entropy; and
a generation subunit configured to extract one or more target user identifiers related to the target user attributes, second user data related to the target user identifiers exceeding a predetermined data threshold, and generate the forecast user group corresponding to a second promotion type based on at least information associated with the target user identifiers.

17. The server of claim 15, wherein the determination unit includes:
a push subunit configured to push the first push messages corresponding to the first promotion type of the target user group upon detecting a second push trigger message initiated by the forecast user identifiers in the forecast user group;
a reception subunit configured to receive the first response messages returned by the forecast user identifiers in the forecast user group; and
a determination subunit configured to record the first number of the first push messages and the second number of the first response messages during a first predetermined time period and determine a first ratio between the first number and the second number as the push success rate.

18. The server of claim 14, wherein the message-push device further includes:
a modification module configured to, in response to the push success rate not exceeding the success rate threshold, modify the second user attributes of the forecast user identifiers in the forecast user group corresponding to the second promotion type to configure to the first forecast model.

19. The server of claim 18, wherein the message-push device further includes:
a detection module configured to detect whether an update cycle arrives and, in response to the update cycle arriving, configure the forecast model.

20. A non-transitory computer readable storage medium comprising programming instructions for pushing messages, the programming instructions configured to cause one or more data processors to execute operations comprising:
upon receiving a push trigger message, acquiring one or more first user identifiers corresponding to the push trigger message;
in response to the acquired first user identifiers being in a predetermined target user group, selecting one or more first push messages based on at least information associated with a first promotion type of the target user group; and
pushing the first push messages based on at least information associated with the first user identifiers,
wherein the target user group includes a plurality of second user identifiers and is generated by statistical processing of first user attributes of registered user identifiers based on at least information associated with a predetermined first forecast model, wherein the programming instructions are further configured to cause the one or more data processors to execute;

selecting, randomly, one or more fourth user identifiers from login user identifiers to obtain a second user group, the fourth user identifiers corresponding to information associated with a third promotion type and one or more fourth user attributes;

pushing one or more second push messages corresponding to the third promotion type of the second user group upon detecting a third push trigger message initiated by the fourth user identifiers in the second user group;

receiving one or more second response messages returned by the fourth user identifiers in the second user group;

recording a third number of the second push messages and a fourth number of the second response messages during a second predetermined time period;

determining a second ratio of the third number of the second push messages and the fourth number of the second response messages as a success rate threshold; and configuring the first forecast model based on a comparison result between a push success rate of a predetermined initial forecast model and the success rate threshold.

* * * * *